United States Patent
Okada et al.

(10) Patent No.: US 8,149,479 B2
(45) Date of Patent: Apr. 3, 2012

(54) ORIGINAL TRANSPORT AND READING APPARATUS

(75) Inventors: Tomohiko Okada, Kyoto (JP); Yoshitaka Okahashi, Nara (JP); Kenji Tanaka, Kyoto (JP); Mitsuharu Yoshimoto, Nara (JP); Shohichi Fukutome, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 572 days.

(21) Appl. No.: 12/275,439

(22) Filed: Nov. 21, 2008

(65) Prior Publication Data
US 2009/0135457 A1 May 28, 2009

(30) Foreign Application Priority Data

Nov. 26, 2007 (JP) ................. 2007-304772

(51) Int. Cl.
*H04N 1/04* (2006.01)

(52) U.S. Cl. .......................... 358/496; 358/498; 358/474

(58) Field of Classification Search .................. 358/496, 358/498, 463, 401, 501, 474, 505, 296; 399/98, 399/71, 367, 364, 374, 373, 361, 34, 245
See application file for complete search history.

(56) References Cited

U.S. PATENT DOCUMENTS

| | | | | |
|---|---|---|---|---|
| 4,558,373 A * | 12/1985 | Plasencia et al. | ............ | 358/484 |
| 5,157,521 A * | 10/1992 | Chung | ............ | 358/498 |
| 5,239,395 A * | 8/1993 | Kang et al. | ............ | 358/498 |
| 5,579,099 A * | 11/1996 | Nishiyama et al. | ............ | 399/371 |
| 6,181,443 B1 * | 1/2001 | Takahashi et al. | ............ | 358/498 |
| 6,563,611 B1 * | 5/2003 | Kao | ............ | 358/498 |
| 6,600,579 B1 * | 7/2003 | Kumagai et al. | ............ | 358/474 |
| 7,196,827 B2 * | 3/2007 | Yamanaka | ............ | 358/496 |
| 7,352,495 B2 * | 4/2008 | Sugeta | ............ | 358/474 |
| 7,630,102 B2 * | 12/2009 | Kurokawa | ............ | 358/474 |
| 2008/0170873 A1 * | 7/2008 | Iino | ............ | 399/71 |
| 2008/0316544 A1 * | 12/2008 | Hiromatsu et al. | ............ | 358/448 |

FOREIGN PATENT DOCUMENTS

| | | |
|---|---|---|
| JP | 2002-232643 | 8/2002 |
| JP | 2003-110808 | 4/2003 |
| JP | 2005-269210 | 9/2005 |

* cited by examiner

*Primary Examiner* — Cheukfan Lee
(74) *Attorney, Agent, or Firm* — Renner, Otto, Boisselle & Sklar, LLP

(57) ABSTRACT

An original transport and reading apparatus is provided with an original transport portion that transports an original, an original reading portion that reads the original transported by the original transport portion through a reading region of a reading glass, and a control portion that controls the original transport portion. The control portion executes foreign matter removal at the reading region of the reading glass by controlling the original transport portion so as to cause the original to advance in a reverse direction to a transport direction of when the original is being read and causes the original to contact at least the reading region of the reading glass.

12 Claims, 10 Drawing Sheets

(a)

(b)

(c)

(a)

(b)

ORIGINAL TRANSPORT AND READING APPARATUS

BACKGROUND OF THE INVENTION

This application claims priority under 35 U.S.C. §119(a) on Patent Application No. 2007-304772 filed in Japan on Nov. 26, 2007, the entire contents of which are herein incorporated by reference.

The present invention relates to original transport and reading apparatuses, and particularly relates to original transport and reading apparatuses that use an original reading portion to read an original transported by an original transport portion through a reading region of an optically transmissive member.

Original transport and reading apparatuses have long and commonly been used in image forming apparatuses and the like such as copier machines and multifunction machines. In these conventional original transport and reading apparatuses, it is common that an original reading portion reads an original transported by an original transport portion through a reading region of an optically transmissive member such as a reading glass or the like.

In these original transport and reading apparatuses, foreign matter such as paper dust and other dust may sometimes adhere on the reading region of the optically transmissive member, and when this happens there is a problem in that image deterioration such as white streaks or other streaks tends to occur in the image that has been read. For example, during an operation of reading an original in the original transport and reading apparatus, paper dust that has been rubbed off from the original may adhere on the reading region of the reading glass, thereby reducing the image quality of the original image that has been read.

With respect to this issue, JP 2003-110808A proposes an original transport and reading apparatus structured such that the reading glass is arranged having an inclination, and foreign matter such as dust is caused to drop and be removed due to the transported original and gravity.

However, the original transport and reading apparatus described in JP 2003-110808A necessitates a new mechanism for foreign matter removal, thereby increasing the number of components by that extent, which also tends to increase the size of the apparatus.

Accordingly, an object of the present invention is to provide an original transport and reading apparatus that uses an original reading portion to read an original transported by an original transport portion through a reading region of an optically transmissive member, this being an original transport and reading apparatus that does not require a new mechanism for foreign matter removal and accordingly is capable of effectively removing foreign matter from the reading region of the optically transmissive member without increasing the size of the apparatus.

SUMMARY OF THE INVENTION

To address these issues, the present invention provides an original transport and reading apparatus that is provided with an original transport portion that transports an original, an original reading portion that reads the original transported by the original transport portion through a reading region of an optically transmissive member, and a control portion that controls the original transport portion, wherein the control portion executes foreign matter removal at the reading region of the optically transmissive member by controlling the original transport portion so as to cause the original to advance in a reverse direction to a transport direction of when the original is being read and causes the original to contact at least the reading region of the optically transmissive member.

In the original transport and reading apparatus according to the present invention, the control portion executes foreign matter removal in which foreign matter (for example, paper dust and other dust) at the reading region of the optically transmissive member is removed by controlling the original transport portion so as to cause the original to advance in a reverse direction to the transport direction and causes the original to contact at least the reading region of the optically transmissive member (for example, a reading glass or the like), and therefore the original (mainly an upstream side edge portion of the original in the transport direction) can be caused to reliably contact at least the reading region of the optically transmissive member, and a high foreign matter removal effect can be obtained. Accordingly, adherence of foreign matter to the reading region of the optically transmissive member can be effectively prevented, and in this way the image quality of the original image can be improved. Furthermore, since a new mechanism is not required for foreign matter removal, there is no increase in the number of components and accordingly the apparatus is not caused to increase in size.

In the original transport and reading apparatus according to the present invention, the following (a) and (b) modes can be set forth as specific modes by which a timing for executing the foreign matter removal can be determined.

(a)

A mode in which a foreign matter detection portion is provided that detects the presence/absence of foreign matter at the reading region of the optically transmissive member, wherein the control portion determines the presence/absence of foreign matter based on output from the foreign matter detection portion and executes the foreign matter removal when foreign matter is judged to be present. In this mode it is preferable that the control portion determines the presence/absence of foreign matter based on output from the foreign matter detection portion after reading of the original and executes the foreign matter removal when foreign matter is judged to be present. In this way, foreign matter that may adhere to the reading region of the optically transmissive member after the original has been read can be removed.

For example, the following (a1) to (a3) modes can be set forth as more specific modes.

(a1)

A mode in which the original transport portion is provided with a reading guide that is arranged so as to face the reading region of the optically transmissive member with the original to be transported in between, wherein a portion of the reading guide, being a portion that faces at least the reading region, is a black color or a dark color, and the foreign matter detection portion detects the presence of foreign matter based on output from the original reading portion when there is no original. With this mode, the presence/absence of foreign matter at the reading region of the optically transmissive member can be detected without providing a separate foreign matter detection portion.

(a2)

A mode in which the control portion determines the presence/absence of foreign matter based on output from the foreign matter detection portion after execution of the foreign matter removal and executes the foreign matter removal again when foreign matter is judged to be present. With this mode, foreign matter at the reading region of the optically transmissive member can be removed reliably.

(a3)

A mode in which the (a1) and (a2) modes are combined.

In the (a2) or (a3) mode, the following further (a4) to (a6) modes can be set forth.

(a4)

A mode in which, in the case where the foreign matter removal is to be executed again, the control portion counts the number of times the presence of foreign matter has been detected continuously by the foreign matter detection portion, and when the presence of foreign matter has been detected continuously for a predetermined multiple number of times by the foreign matter detection portion after execution of the foreign matter removal, a warning is issued (for example, a cautionary display is carried out) and operation of the apparatus is paused. With this mode, in addition to being able to report to the user that foreign matter could not be removed even after the above-described foreign matter removal has been carried the multiple number of times, it is possible to prohibit reading operations of original images where deteriorated image quality due to foreign matter is likely to occur, which makes it possible to eliminate by that extent performing reading operations to no purpose.

(a5)

A mode in which, in the case where the foreign matter removal is to be executed again, the control portion counts the number of times the presence of foreign matter has been detected continuously by the foreign matter detection portion, and when the presence of foreign matter has been detected continuously for a predetermined multiple number of times by the foreign matter detection portion after execution of the foreign matter removal, operation of the apparatus is paused after discharge of the original from an apparatus main unit. With this mode, in addition to being able to avoid original blockages (original jams) inside the apparatus main unit by discharging the original before pausing operation of the apparatus, it is possible to prohibit reading operations of original images where deteriorated image quality due to foreign matter is likely to occur, which makes it possible to eliminate by that extent performing reading operations to no purpose.

(a6)

A mode in which the (a4) and (a5) modes are combined.

(b)

A mode in which the control portion counts the transport sheet number of the originals and executes the foreign matter removal for each predetermined number of sheets.

In the original transport and reading apparatus according to the present invention, it is preferable that the original transport portion is provided with an original transport path that guides the original immediately after the original that is transported passes the optically transmissive member, and that the original transport path is arranged inclined at a predetermined inclination angle with respect to the optically transmissive member. By doing this, it is possible to cause the original (particularly the upstream side end portion of the original) to reliably contact the optically transmissive member when causing the original to advance in the reverse direction to the transport direction.

In this regard, in executing the foreign matter removal, in the case where the original is caused to advance in the reverse direction to the transport direction at the transport speed of when reading the original, there is a risk that original will bend excessively when the original is less thick. From this perspective, in the original transport and reading apparatus according to the present invention, it is preferable that in executing the foreign matter removal, in the case where an original thickness is a predetermined thickness or less, the control portion sets the advancement speed of when causing the original to advance in a reverse direction to the transport direction lower than a transport speed during original reading. By doing this, it is possible to effectively prevent excessive bending of the original when the original is caused to advance in the reverse direction to the transport direction.

On the other hand, in executing the foreign matter removal, in the case where the original is caused to advance in the reverse direction to the transport direction at the transport speed of when reading the original, there are cases where there is no impediment even if the advancement speed of causing the original to advance in the reverse direction were to be raised when the original has a certain thickness. From this perspective, in the original transport and reading apparatus according to the present invention it is preferable that in executing the foreign matter removal, in the case where an original thickness exceeds a predetermined thickness, the control portion sets the advancement speed of when causing the original to advance in a reverse direction to the transport direction higher than a transport speed during original reading. By doing this, the processing time for foreign matter removal can be shortened.

In the original transport and reading apparatus according to the present invention, in executing the foreign matter removal, the control portion may cause the original to move multiple times backward and forward so that an upstream side edge of the original in the transport direction passes over at least the reading region while the original is in contact with the optically transmissive member. By doing this, it is possible to cause the original to contact even more reliably at least the reading region of the optically transmissive member, and it is possible to even more effectively remove foreign matter at the reading region of the optically transmissive member.

Furthermore, in the original transport and reading apparatus according to the present invention, in executing the foreign matter removal, the control portion can carry out control of the movement distance of the original using the timing by which the position of the upstream side edge of the original being transported passes a predetermined reference position as a reference. In this case, the precision in controlling the movement distance of the original tends to worsen as the reference position becomes farther apart from the reading region of the optically transmissive member. From this perspective it is preferable that in executing the foreign matter removal, the control portion uses the original reading portion to read the transport direction upstream side edge of the original to control the movement distance of the original using the time of reading of the upstream side edge by the original reading portion as a reference. By doing this, the precision in controlling the movement distance of the original can be improved.

As described above, with the present invention, an original transport and reading apparatus can be provided that uses an original reading portion to read an original transported by an original transport portion through a reading region of an optically transmissive member, this being an original transport and reading apparatus that does not require a new mechanism for foreign matter removal and accordingly is capable of effectively removing foreign matter from the reading region of the optically transmissive member without increasing the size of the apparatus.

BRIEF DESCRIPTION OF THE DRAWINGS

FIG. 3A is a diagram showing a state after a trailing edge portion of the original transported in a transport direction has passed a reading region of the reading glass. FIG. 3B is a diagram showing a state in which the trailing edge portion of the original, which is advancing in a reverse direction, is contacting a downstream side in the transport direction from the reading region of the reading glass. FIG. 3C is a diagram showing a state in which foreign matter at the reading region of the reading glass is being removed at a trailing edge of the original, which is advancing in the reverse direction.

FIG. 4A is a diagram showing output in a state when foreign matter is not present on the reading region of the reading glass. FIG. 4B is a diagram showing output in a state when foreign matter is present on the reading region of the reading glass.

FIG. 7A is a diagram showing a position of the original after the passing of a first time period in which it is transported in the transport direction from a detection position of a transport sensor. FIG. 7B is a diagram showing a position of the original after the passing of a second time period in which it is transported in the transport direction from the position shown in FIG. 7A. FIG. 7C is a diagram showing a position of the original after the passing of a third time period in which it is transported in the transport direction from the position shown in FIG. 7B. FIG. 7D is a diagram showing a state when the original is caused to go backward from the position shown in FIG. 7B for a fifth time period. FIG. 7E is a diagram showing a state when the original is transported in the transport direction from the position shown in FIG. 7D for a sixth time period (=fifth time period).

DESCRIPTION OF THE PREFERRED EMBODIMENTS

Hereinafter, embodiments of the present invention are described with reference to the accompanying drawings. It should be noted that the following embodiments are single specific examples of the present invention and are not of a nature that limits the scope of the present invention.

Figure 1:
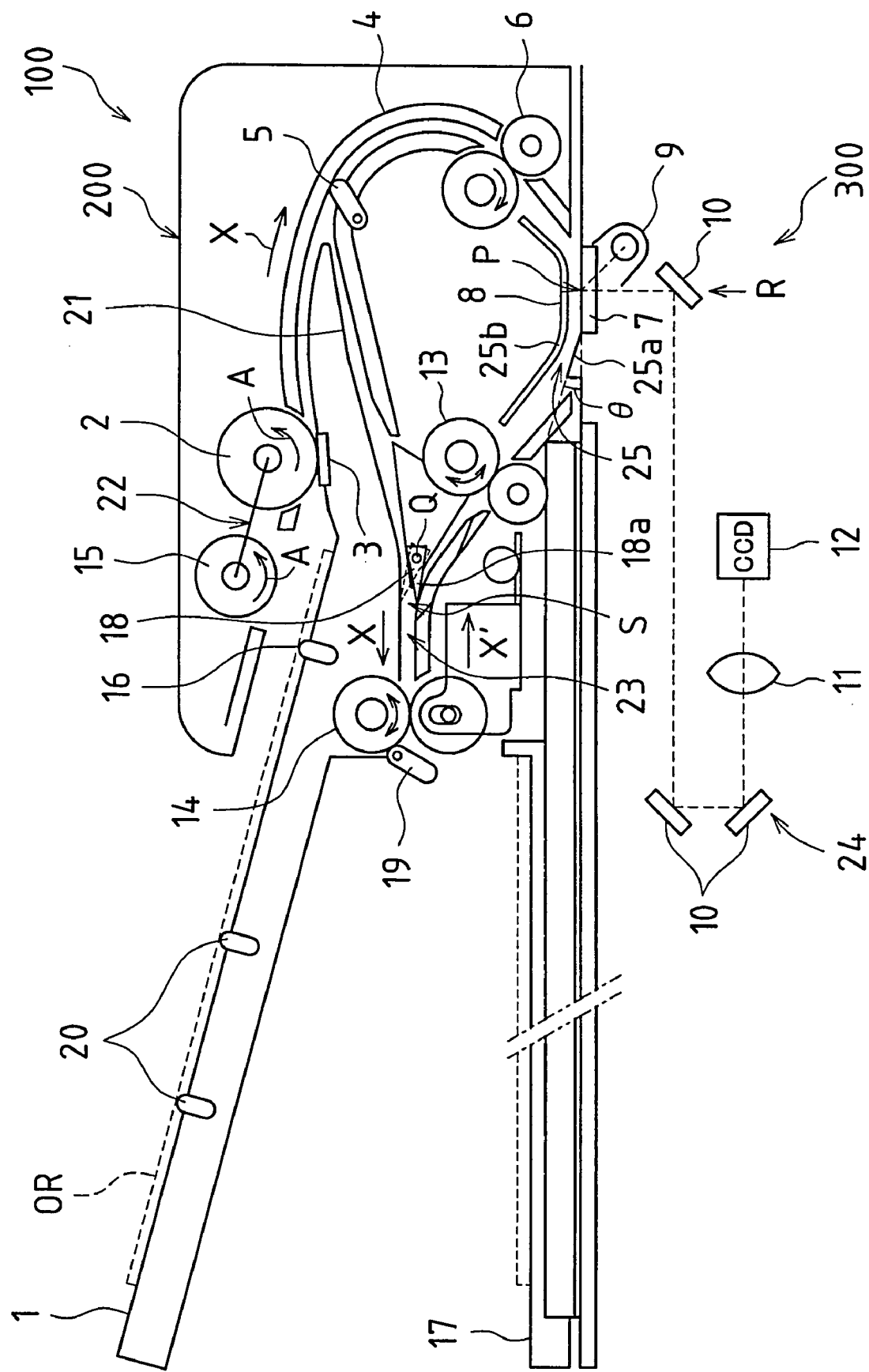
FIG. 1 is an outline profile view of an original transport and reading apparatus according to an embodiment of the present invention.

Regarding the Overall Configuration of the Original Transport and Reading Apparatus FIG. 1 is an outline profile view of an original transport and reading apparatus 100 according to an embodiment of the present invention. The original transport and reading apparatus 100 shown in FIG. 1 is provided with an original transport portion 200 that transports an original OR, an original reading portion 300 that reads the original OR transported by the original transport portion 200 through a reading region P of an optically transmissive member 7 (here, a reading glass and referred to hereinafter as reading glass 7), and a control portion 400 (not shown in FIG. 1, see FIG. 2 described later) that controls the original transport portion 200.

Under the direction of the control portion 400, the original transport and reading apparatus 100 is capable of using the original reading portion 300 to read an image of the original OR that passes the reading region P corresponding to an original reading position R of the original reading portion 300 on the reading glass 7 while using the original transport portion 200 to transport the original OR that has been loaded on an original tray 1 in a predetermined transport direction (a direction that is a transport direction when reading the original OR (arrow X direction in FIG. 1)).

In the present embodiment, the original transport portion 200 is configured provided with an original loading portion 1 (here, an original tray and hereinafter referred to as original tray 1), which is arranged relatively upwardly, a discharge portion 17 (here, a discharge tray and hereinafter referred to as discharge tray 17), which is arranged below the original tray 1, and a first transport path 4 that connects between these. And the original transport portion 200 is provided with two pairs of transport rollers constituted by an upstream side transport roller pair 6, which transports the original OR on an upstream side in the transport direction X of the original OR, and a downstream side transport roller pair 13, which transports the original OR on a downstream side. The reading glass 7 is positioned between these two transport roller pairs 6 and 13. That is, the upstream side transport roller pair 6, the reading glass 7, and the downstream side transport roller pair 13 are arranged along the transport direction X in that order. Furthermore, the reading glass 7 is provided substantially horizontally so as to demarcate a transport wall of the first transport path 4.

The original transport portion 200 is further provided with a pickup roller 15, a separator roller 2 (a sorting roller), and a separation member 3 such as a separation pad or the like (here, a separation pad and hereinafter referred to as separation pad 3).

The pickup roller 15 is a component that feeds the originals OR that have been loaded (stacked) on the original tray 1 from the original tray 1 into the first transport path 4 along the transport direction X. The separator roller 2 is arranged on the downstream side from the pickup roller 15 in the transport direction X and transports the original OR, which has been fed in by the pickup roller 15, further to the downstream side in the transport direction X while sandwiching the original OR with the separation pad 3. Arranged in opposition to the separator roller 2, the separation pad 3 sorts (separates) the originals OR so that only one sheet of original OR is transported between itself and the separator roller 2.

In the thus-configured original transport portion 200, the originals OR are transported by the pickup roller 15 between the separator roller 2 and the separation pad 3 where they are sorted and separated, and then transported sheet by sheet due to the separator roller 2 being rotationally driven. And it becomes possible to supply the originals OR transported by the separator roller 2 sheet by sheet to the upstream side transport roller pair 6 by guiding the originals OR to the first transport path 4.

Specifically, due to a pickup roller drive portion 401 (see FIG. 2), which is described later, the pickup roller 15 can be brought into and out of contact with the originals OR loaded on the original tray 1. Furthermore, the pickup roller 15 is coupled to the separator roller 2 via a drive transmission means 22 including an endless belt or the like so as to rotate in the same direction as the separator roller 2. When there is a request to read an original OR, the pickup roller 15 and the separator roller 2 are rotationally driven in a direction (arrow A in FIG. 1) that transports the original OR in the transport direction X by a transport drive portion 402 (see FIG. 2), which is described later.

In the present embodiment, the original transport portion 200 is configured such that after the original OR is turned over so that its front and back are inverted, and transport is performed to enable reading of the surface of one side of the original OR, the original OR is turned over so that its front and back are inverted, and transport is performed to enable reading of the surface of the other side of the original OR.

Specifically, in addition to the above-described configuration, the original transport portion 200 is further provided with an inversion roller pair 14, a second transport path 21, and a switching claw 18.

The first transport path 4 is formed in a loop shape such that the originals OR are transported from the separator roller 2 to the discharge tray 17 via the upstream side transport roller pair 6, the reading glass 7, the downstream side transport roller pair 13, and the inversion roller pair 14. The inversion roller pair 14 is arranged on the downstream side from the downstream side transport roller pair 13 in the transport direction X and transports the original OR that has been transported in from the downstream side transport roller pair 13 such that the upstream side edge of the original OR (hereinafter referred to as trailing edge) in the transport direction X becomes in front. The second transport path 21 branches from a branching portion S between the inversion roller pair 14 and the downstream side transport roller pair 13, and guides the original OR, which has been transported by the inversion roller pair 14 so that the trailing edge of the original OR becomes in front, to an upstream side in the transport direction X from the upstream side transport roller pair 6 of the first transport path 4 to cause the original OR to be turned over so that its front and back are inverted. A switchback transport path 23 is formed between the inversion roller pair 14 of the first transport path 4 and the branching portion S. The switchback transport path 23 is configured as a transport path capable of performing transport of the original OR due to rotation of the inversion roller pair 14 in a forward direction (transport direction X of the original OR) and performing reverse transport of the original OR due to reverse direction rotation.

The switching claw 18 is arranged at the branching portion S and is configured to be capable of taking a first switching posture, which guides the original OR from the inversion roller pair 14 to the upstream side transport roller pair 6 via the second transport path 21, and a second switching posture, which guides the original OR from the downstream side transport roller pair 13 to the inversion roller pair 14 via the switchback transport path 23.

Here, in a normal state, the switching claw 18 is arranged in a manner that directly connects the switchback transport path 23 and the second transport path 21 (first switching posture, see the solid line in FIG. 1), and when the original OR that has been read by the original reading portion 300 is transported in the transport direction X, the downstream side edge (hereinafter referred to as leading edge) of the original OR in the transport direction X pushes up against the switching claw 18 such that the original OR is guided to the switchback transport path 23 (second switching posture, see the dashed line FIG. 1). The switching claw 18 freely pivots on a pivot shaft Q in an axial direction of the inversion roller pair 14 such that a claw portion 18*a* drops under its own weight and blocks the first transport path 4 between the downstream side transport roller pair 13 and the inversion roller pair 14 to take the first switching posture. And the switching claw 18 is configured so that when the trailing edge of the original OR is positioned inside the switchback transport path 23, and the original OR is reverse transported by the inversion roller pair 14, which rotates in a reverse direction, in a reverse transport direction (arrow X' direction in FIG. 1) that is an opposite direction to the transport direction X of the original OR, the original OR is guided to the second transport path 21.

It should be noted that the size of the original OR loaded in the original tray 1 is detected by an original size sensor 20 that is arranged in an original loading portion of the original tray 1. The presence/absence of an original OR loaded in the original tray 1 is detected by an original presence/absence detection sensor 16 that is arranged near the pickup roller 15 of the original loading portion of the original tray 1. Furthermore, in a paused state, the upstream side transport roller pair 6 is configured to contact against and adjust the leading edge of the original OR that has been transported by the separator roller 2, then to be rotationally driven matching the timing of reading. The original OR transported in this manner is detected by a transport sensor 5, which is arranged on the downstream side from the second transport path 21 in the transport direction X of the first transport path 4 and on the downstream side from the upstream side transport roller pair 6. Furthermore, the original OR that is discharged by the inversion roller pair 14 is detected by a discharge sensor 19 that is arranged near the inversion roller pair 14 on a discharge side from the inversion roller pair 14.

Furthermore, in the present embodiment, the original transport portion 200 is further provided with a reading guide 8 that has a portion in opposition to at least the reading region P of the reading glass 7 with the transported original OR therebetween.

The original reading portion 300 is provided with a light source 9 that irradiates light from a side opposite to the side of the reading glass 7 where the original OR is transported, an optical system 24 that transmits image light from the original OR through the reading glass 7, and an imaging device 12 (here, a CCD (charge coupled device) and hereinafter referred to as CCD 12) that converts original image light from the optical system 24 to electrical signals as image data.

Specifically, the optical system 24 is provided with a plurality of reflector mirrors 10 and an optical lens 11. The reflector mirrors 10 guide the image light that is reflected from the original OR through the reading glass 7 to the optical lens 11. The optical lens 11 focuses the original image light from the reflector mirrors 10 onto the CCD 12.

In the original reading portion 300 provided with this configuration, light is irradiated from the light source 9 onto the original OR that is transported along the reading guide 8, the light is then reflected by the original OR and penetrates the reading glass 7 to be condensed by the optical lens 11 via the reflector mirrors 10 and converted to image data by the CCD 12.

In the above-described original transport and reading apparatus 100, when there is an instruction to read originals OR, the originals OR loaded in the original tray 1 are picked up by the pickup roller 15 then separated sheet by sheet by the separator roller 2 and the separation pad 3 and transported on the first transport path 4. In regard to the original OR that has been transported on the first transport path 4, after the transport of the original OR has been confirmed by the transport sensor 5, the leading edge of the original OR is aligned by the upstream side transport roller pair 6 to prevent slanted transport, which also feeds the original OR with a prescribed reading timing, then the front and back of the original OR are turned over for transport to the reading glass 7, and further still an original image is read by the original reading portion 300 through the reading region P of the reading glass 7.

The original OR for which reading has been completed is withdrawn from the reading region P by the downstream side transport roller pair 13 and discharged by way of the switchback transport path 23 of the first transport path 4 onto the discharge tray 17 by the inversion roller pair 14, which is capable of reverse rotation.

Furthermore, in the case where the surface of one side of the original OR and the surface of the other side are both to be read, the original OR whose surface on the one side has been read is not discharged to the discharge tray 17, but rather is transported so that the trailing edge of the original OR is positioned inside the switchback transport path 23, then reverse transported in the reverse transport direction X' by the inversion roller pair 14, which rotates in the reverse direction, and guided to the second transport path 21 by the switching claw 18, which is in the first switching posture. The original OR that has been guided to the second transport path 21 has its front and back turned over by returning again to the first transport path 4 via the second transport path 21 and is transported by the upstream side transport roller pair 6 to pass over the reading glass 7 where the surface of its other side is read. With the reading of both of its surfaces finished in this manner, the original OR has its front and back turned over by returning again to the first transport path 4 and is transported by the transport roller pairs 6 and 13, after which it passes through the switchback transport path 23 of the first transport path 4 and is discharged to the discharge tray 17 via the inversion roller pair 14, which rotates in the forward direction.

It should be noted that here, in order to avoid vibration of the original OR while the original OR passes over the reading glass 7 when reading an image of the original, the original OR is transported with the peripheral velocity of the downstream side transport roller pair 13 being approximately 0.1% faster than the peripheral velocity of the upstream side transport roller pair 6 so that the original OR does not contact the reading glass 7. At this time, if foreign matter such as paper dust or the like is adhering to the original OR, it may sometimes drop onto the reading glass 7.

Regarding Control by the Control Portion

Figure 2:
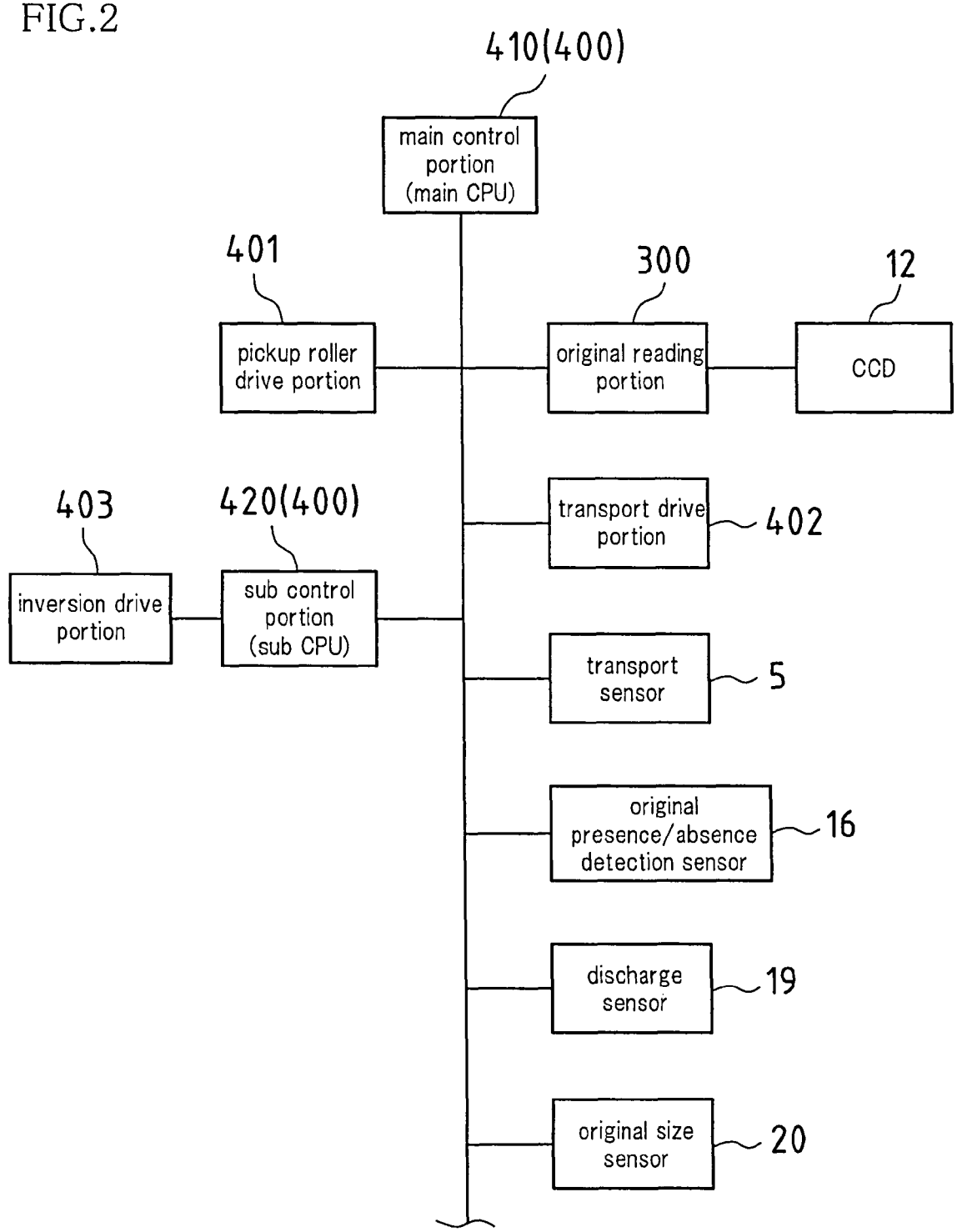
FIG. 2 is a block diagram that schematically shows principal portions of an electrical configuration of the original transport and reading apparatus shown in FIG. 1.

Next, description is given regarding control by the control portion 400 in the original transport and reading apparatus 100 shown in FIG. 1. FIG. 2 is a block diagram that schematically shows principal portions of the electrical configuration of the original transport and reading apparatus 100 shown in FIG. 1.

The original transport and reading apparatus 100 is further provided with the pickup roller drive portion 401 such as an electromagnetic solenoid for causing the pickup roller 15 to move such that it is brought into and out of contact with the original OR, the transport drive portion 402 such as a drive motor for driving the pickup roller 15, the separator roller 2, and the upstream side transport roller pair 6, and an inversion drive portion 403 such as a drive motor for driving the downstream side transport roller pair 13 and the inversion roller pair 14.

The control portion 400 is provided with a CPU (central processing unit) and a storage portion. The storage portion includes a ROM (read only memory) and a RAM (random access memory), and stores various control programs and necessary data. The control portion 400 is configured such that the various control programs are read out from the storage portion by the CPU and control of overall operations of the apparatus is performed by executing the control programs that have been read out. The control portion 400 is here constituted by a main control portion (main CPU) 410 and sub control portion (sub CPU) 420. The main control portion 410 manages overall operational control of the apparatus. The sub control portion 420 manages operational control of the inversion drive portion 403.

The main control portion 410 is connected at an input system to the CCD 12 of the original reading portion 300 and obtains image data of the original reading from the CCD 12. Furthermore, the main control portion 410 is connected at an output system to the pickup roller drive portion 401, the transport drive portion 402, and the sub control portion 420, and outputs operation signals to the drive portions 401 and 402 and the sub control portion 420. The sub control portion 420 outputs operation signals to the inversion drive portion 403. Further still, the main control portion 410 is connected at its input system to the original size sensor 20, the original presence/absence detection sensor 16, the transport sensor 5, and the discharge sensor 19, and receives the output signals from the sensors 20, 15, 5, and 19.

The control portion 400 (main control portion 410) is configured to control the original transport portion 200 and causes the original OR to contact at least the reading region P of the reading glass 7 while causing the original OR to advance in the reverse direction X' to the transport direction X during reading of the original OR, thereby executing foreign matter removal in which foreign matter such as paper dust at the reading region P of the reading glass 7 is removed.

Hereinafter description is given of an upstream side edge portion (hereinafter referred to as trailing edge portion) of the original OR in the transport direction X as an example of the contact position of the original OR to the reading glass 7. Note however that the position of the original OR that is caused to contact the reading glass 7 is not limited to the trailing edge portion.

Regarding Foreign Matter Removal Operations (Foreign Matter Removal Process)

Figure 3:
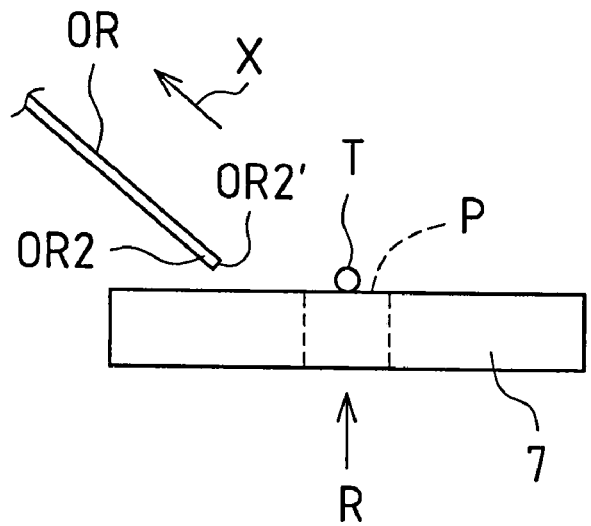
FIG. 3 is constituted by FIG. 3A, FIG. 3B, and FIG. 3C and includes outline lateral views for describing foreign matter removal operations for foreign matter removal.
Figure 3:
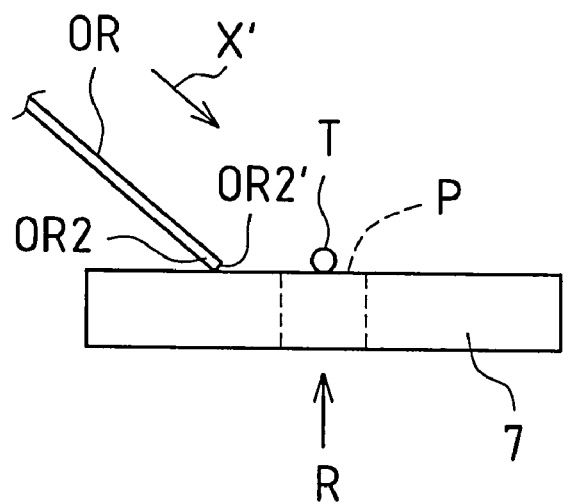
Figure 3:
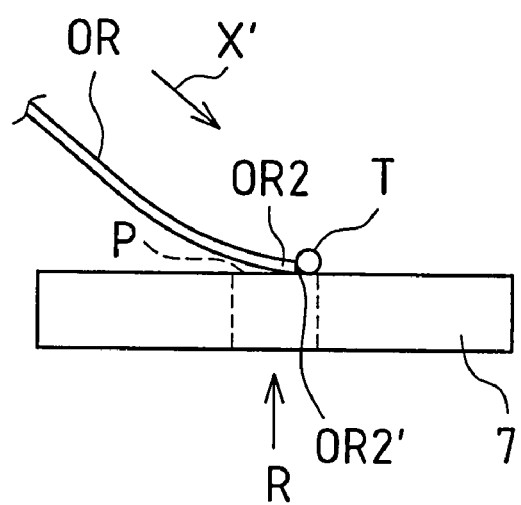

Next, description is given regarding foreign matter removal operations executed in the original transport and reading apparatus 100. FIG. 3 includes outline lateral views for describing foreign matter removal operations for foreign matter removal. FIG. 3A is a diagram showing a state after a trailing edge portion OR2 of the original OR transported in the transport direction X has passed the reading region P of the reading glass 7. FIG. 3B is a diagram showing a state in which the trailing edge portion OR2 of the original OR, which is advancing in the reverse direction X', is contacting a downstream side in the transport direction X from the reading region P of the reading glass 7. FIG. 3C is a diagram showing a state in which foreign matter T at the reading region P of the reading glass 7 is being removed at a trailing edge OR2' of the original OR, which is advancing in the reverse direction X'.

In executing foreign matter removal in the original transport and reading apparatus 100, the original OR that has been transported from the original tray 1 by the pickup roller 15 is transported to the upstream side transport roller pair 6 by the separator roller 2. Following this, the leading edge of the original OR that has been transported by the upstream side transport roller pair 6 passes the reading glass 7 and, after being transported until the downstream side transport roller pair 13, is transported by the downstream side transport roller pair 13 toward the inversion roller pair 14. The trailing edge OR2' of the original OR that has been transported until the inversion roller pair 14 passes at least the reading region P of the reading glass 7 due to forward rotation of the inversion roller pair 14 and the downstream side transport roller pair 13, and is transported toward the discharge tray 17 side such that it becomes positioned between the branching portion S and the reading region P. When the trailing edge OR2' of the original OR has reached a position between the branching portion S and the reading region P, rotation of the inversion roller pair 14 and the downstream side transport roller pair 13 stops (see FIG. 3A). Here, trailing edge OR2' of the original OR signifies an upstream side end (edge) of the original OR in the transport direction X, and trailing edge portion OR2 of the original OR signifies the portion near the trailing edge OR2' of the original.

Following this, the inversion roller pair 14 and the downstream side transport roller pair 13 are caused to rotate in the reverse direction, and the original OR advances the reverse direction X' to the transport direction X such that the trailing edge portion OR2 contacts the reading glass 7 (see FIG. 3B). When the inversion roller pair 14 and the downstream side transport roller pair 13 are further caused to reverse rotate, the trailing edge portion OR2 proceeds to the reading region P of the reading glass 7. If foreign matter T is present on the reading region P at this time, the foreign matter T is scraped by the trailing edge OR2' and removed from the reading region P (see FIG. 3C). Then, when the inversion roller pair 14 and the downstream side transport roller pair 13 are again caused to reverse rotate, the trailing edge portion OR2 proceeds to the upstream side in the transport direction X from the reading region P of the reading glass 7 along with the foreign matter T, then rotation of the inversion roller pair 14 and the downstream side transport roller pair 13 is stopped, then caused to forward rotate again. In this manner, foreign matter removal is executed.

In this way, with the original transport and reading apparatus 100 according to the present embodiment, while the original OR is caused to advance in the reverse transport direction X', the trailing edge portion OR2 of the original OR is caused to contact at least the reading region P of the reading glass 7, and foreign matter removal is executed by which foreign matter T on the reading region P of the reading glass 7 is removed, and therefore the trailing edge portion OR2 of the original OR can be made to reliably contact at least the reading region P of the reading glass 7 and a high foreign matter removal effect can be obtained. Accordingly, adherence of foreign matter T to the reading region P of the reading glass 7 can be reduced or eliminated as much as possible, and in this way the image quality of the original image can be improved. Furthermore, since a new mechanism is not required for foreign matter removal, there is no increase in the number of components and accordingly the apparatus 100 is not caused to increase in size.

In the original transport and reading apparatus 100 according to the present embodiment, from a perspective that it is preferable for foreign matter T on the reading region P of the reading glass 7 to be removed after the original OR has been read, a foreign matter detection portion may be provided that detects the presence/absence of foreign matter T at the reading region P of the reading glass 7, and the control portion 400 (main control portion 410) may determine the presence/absence of the foreign matter T based on output from the foreign matter detection portion after reading of the original OR such that in the case where the foreign matter T is judged to be present, the above-described foreign matter removal can be executed.

In the case where foreign matter presence/absence is determined by the foreign matter detection portion, at least a portion of the reading guide 8 in opposition to the reading region P (that is, a portion that can be read by the original reading portion 300 when there is no original OR) is formed having a member that is a black color or a dark color. The foreign matter detection portion detects the presence of the foreign matter T based on output from the original reading portion 300 when there is no original OR. By doing this, a foreign matter detection operation can also be carried out in addition to an original reading operation, and the number of components can be reduced by that extent, and cost reductions can be achieved.

It should be noted that the portion of the reading guide 8 that is in opposition to at least the reading region P may be formed having a darkness such that the output from the CCD 12 of the original reading portion 300 enables the foreign matter T such as paper dust to be clearly distinguished (that is, such that the foreign matter T is conspicuous). Specifically, the reading guide 8 is coated black or is formed using a resin of a color that forms a dark color.

Figure 4:
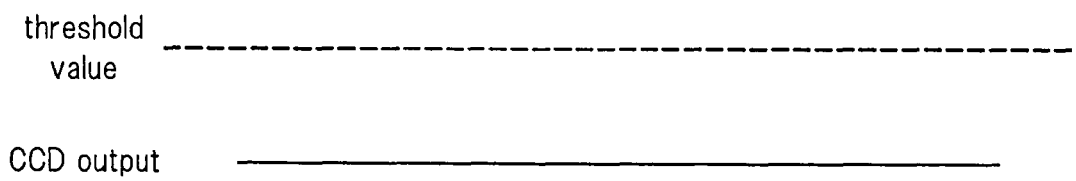
FIG. 4 is constituted by FIG. 4A and FIG. 4B and includes diagrams showing main scanning direction output signals of a certain timing (one line) from a CCD of the original reading portion.
Figure 4:
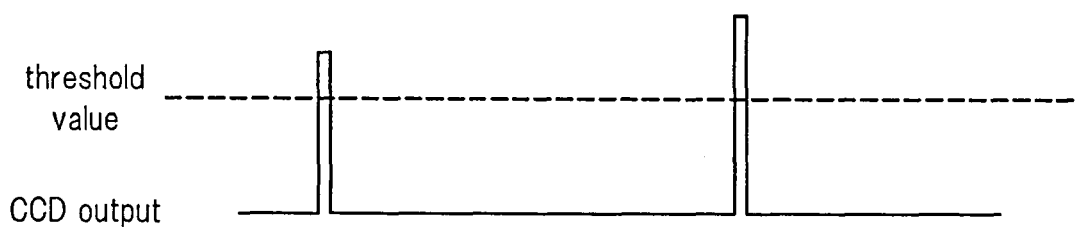

FIG. 4 includes diagrams showing main scanning direction output signals of a certain timing (one line) from the CCD 12 of the original reading portion 300. FIG. 4A shows output in a state when foreign matter T is not present on the reading region P of the reading glass 7. FIG. 4B shows output in a state when foreign matter T is present on the reading region P of the reading glass 7.

As shown in FIG. 4, when detection is carried out when no original OR is being transported, pixels in locations where foreign matter T has adhered are outputted as white (as output values larger than a predetermined threshold value as shown in FIG. 4B), and pixels for which this is not the case are outputted as black (as output values not greater than the predetermined threshold value as shown in FIG. 4A), and therefore is possible to reliably detect the adherence of foreign matter T.

Furthermore, in the original transport and reading apparatus 100 according to the present embodiment, from a perspective of reliably removing foreign matter T on the reading region P of the reading glass 7, the control portion 400 (main control portion 410) may determine the presence/absence of the foreign matter T based on output from the foreign matter detection portion after execution of the above-described foreign matter removal such that in the case where the foreign matter T is judged to be present, the above-described foreign matter removal can be executed again.

The original transport and reading apparatus 100 is further provided with a display device (not shown in drawings) for displaying display information from the control portion 400 (main control portion 410). The display device is here provided at an operation panel (not shown in drawings), which is provided on the front side of the original transport and reading apparatus 100. This enables the adherence of the foreign matter T on the reading region P of the reading glass 7 to be reported to a user.

Furthermore, in a configuration in which the above-described foreign matter removal is executed again, the control portion 400 (main control portion 410) is provided with a foreign matter detection counter C that counts the number of times presence of foreign matter T has been detected continuously by the foreign matter detection portion in the case where the above-described foreign matter removal is to be executed again, and in the case where presence of foreign matter T has been detected continuously by the foreign matter detection counter C for a predetermined multiple number of times by the original reading portion 300, which is the above-mentioned foreign matter detection portion, after execution of the above-described foreign matter removal, a warning display can be carried out on the display device and operation of the apparatus 100 can be paused. By doing this, adherence of the foreign matter T to the reading region P of the reading glass 7 can be reported to the user and it is possible to eliminate performing original reading operations to no purpose, where deteriorated image quality due to foreign matter is likely to occur.

Furthermore, in a configuration in which the above-described foreign matter removal is executed again, in the case where presence of foreign matter T has been detected continuously by the foreign matter detection counter C for a predetermined multiple number of times by the original reading portion 300, which is the above-mentioned foreign matter detection portion, after execution of the above-described foreign matter removal, the control portion 400 (main control portion 410) can pause operation of the apparatus 100 after discharge of the original OR from the original transport portion 200. By carrying out discharge of the original OR before pausing operation of the apparatus 100 in this manner, blockages of originals (original jams) inside the original transport portion 200 can be avoided and it is possible to eliminate performing original reading operations to no purpose, where deteriorated image quality due to foreign matter is likely to occur.

In the original transport and reading apparatus 100 according to the present embodiment, the original transport portion 200 is further provided with an original transport path 25 that guides the original OR immediately after the original OR that is transported passes the reading glass 7. From a perspective of reliably causing the original OR to contact the reading glass 7 when the original OR is caused to advance in the reverse transport direction X' for executing the above-described foreign matter removal, the original transport path 25 is arranged inclined having a predetermined inclination angle θ with respect to the reading glass 7. It should be noted that approximately 5° to 25° can be given as an example of a contact angle θ of the original OR with respect to the reading glass 7, but there is no limitation to this.

Specifically, the original transport path 25 is formed between a first guide member 25a and a second guide member 25b that is arranged facing the first guide member 25a between the reading glass 7 and the downstream side transport roller pair 13 of the first transport path 4. And, of the first guide member 25a and the second guide member 25b, an original transport surface of at least the first guide member 25a is inclined having the inclination angle θ with respect to the reading glass 7. More specifically, the first guide member 25a is integrally formed with a support member that supports the reading glass 7 adjacent to the reading glass 7. Furthermore, the second guide member 25b is integrally formed with the transport direction X downstream side of the reading guide 8.

The original transport and reading apparatus 100 according to the present embodiment is configured to enable an operation of inputting the thickness of the original. For example, it is configured to enable an operation of selectively inputting a thin paper original mode for transporting thin paper originals not thicker than a predetermined first thickness and a thick paper original mode for transporting thick paper originals that exceed a predetermined second thickness.

In executing the above-described foreign matter removal, the control portion 400 (main control portion 410) is configured such that, in the case where the inputted original thickness is the predetermined first thickness or less (for example, in the case where the thin paper original mode has been selected), the advancement speed when causing the original OR to advance in the reverse transport direction X' is made lower than the transport speed during original reading. By doing this, it is possible to effectively prevent excessive bending of the original OR when the original OR is caused to advance in the reverse transport direction X'. Approximately 49 g/m$^2$ can be given as an example of the first thickness, but there is no limitation to this.

Furthermore, in executing the above-described foreign matter removal, the control portion 400 (main control portion 410) is configured such that, in the case where the inputted original thickness exceeds the predetermined second thickness (for example, in the case where the thick paper original mode has been selected), the advancement speed when causing the original OR to advance in the reverse transport direction X' is made higher than the transport speed during original reading. By doing this, the processing time for foreign matter removal can be shortened. The second thickness may be equivalent to the first thickness and may be larger than the first thickness. Here the second thickness is set to a thickness equivalent to the first thickness.

In the original transport and reading apparatus 100 according to the present embodiment, the control portion 400 (main control portion 410) may be configured such that, in a one-time execution of the foreign matter removal, the original OR is caused to move multiple times backward and forward so that the trailing edge OR2' passes over at least the reading region P while the trailing edge portion OR2 is in contact with the reading glass 7. By doing this, it is possible to cause the trailing edge portion OR2 of the original OR to contact even more reliably at least the reading region P of the reading glass 7, and it is possible to even more effectively remove foreign matter T at the reading region P of the reading glass 7.

Furthermore, in the original transport and reading apparatus 100 according to the present embodiment, from a perspective of achieving excellent precision in controlling the movement distance of the original OR, in executing the above-described foreign matter removal, the control portion 400 (main control portion 410) can use the CCD 12 of the original reading portion 300 to read the trailing edge OR2' of the original OR that is advancing in the reverse transport direction X', and can cause the original OR to move using the time of reading of the trailing edge OR2' by the CCD 12 (original reading position R) as a reference so that the original OR is moved by a preset movement distance for foreign matter removal.

Figure 5:
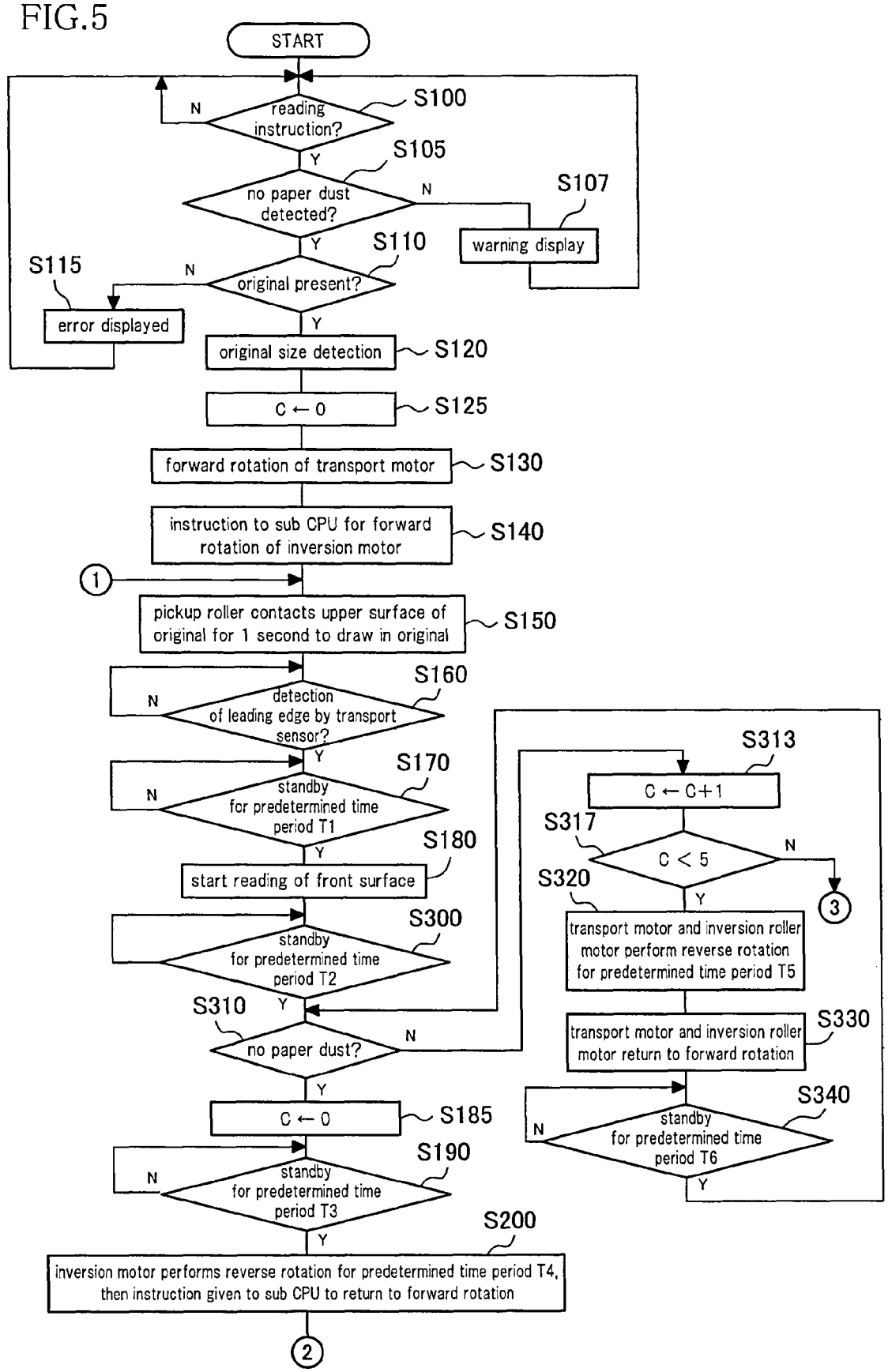
FIG. 5 is a diagram showing a first half portion of a flowchart showing a single example of an operation flow by the main control portion of the original transport and reading apparatus shown in FIG. 1.
Figure 6:
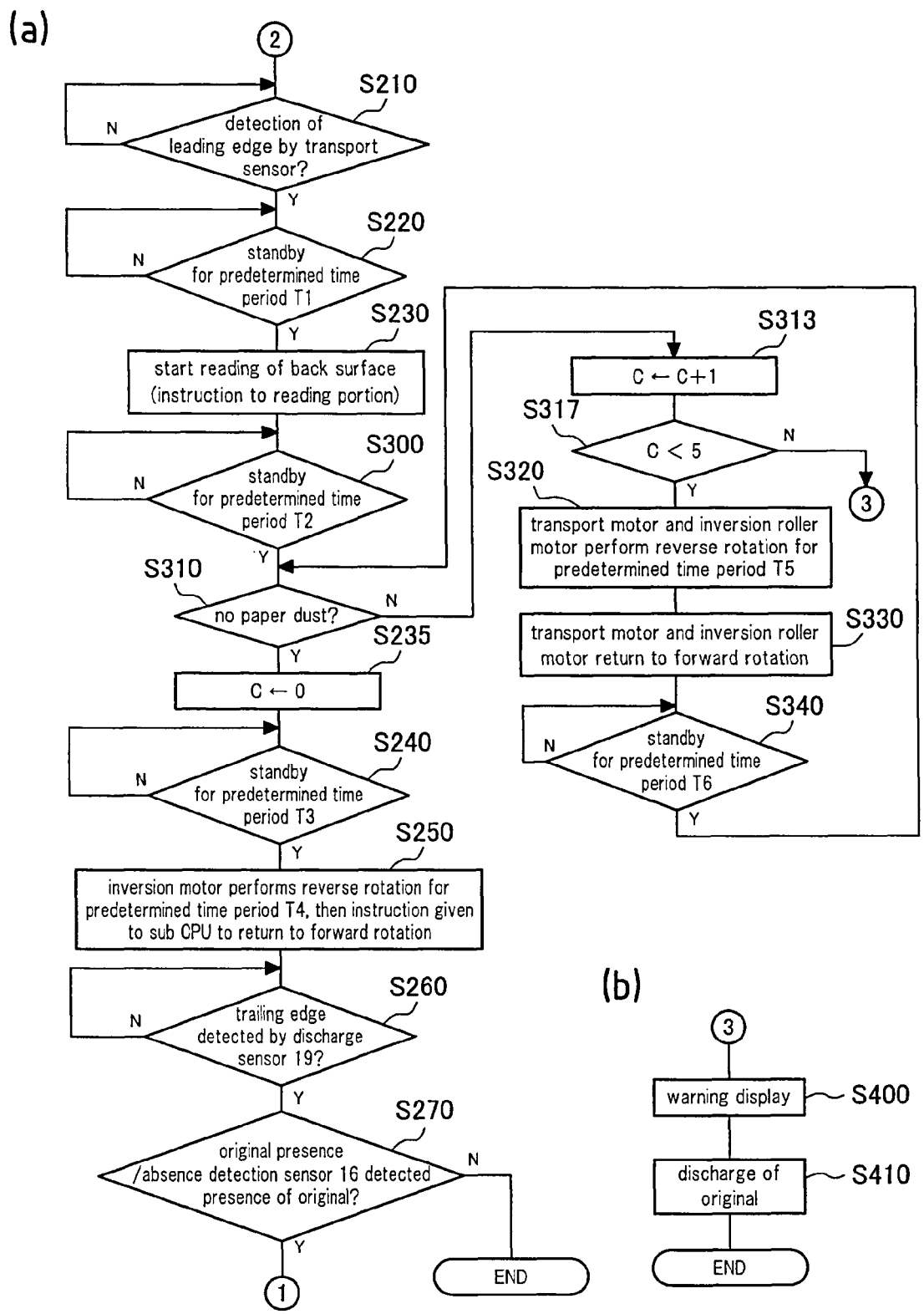
FIG. 6A is a diagram showing a latter half portion of a flowchart showing a single example of an operation flow by the main control portion of the original transport and reading apparatus shown in FIG. 1.
FIG. 6B is a diagram showing a processing flow for carrying out a warning display.
Figure 7:
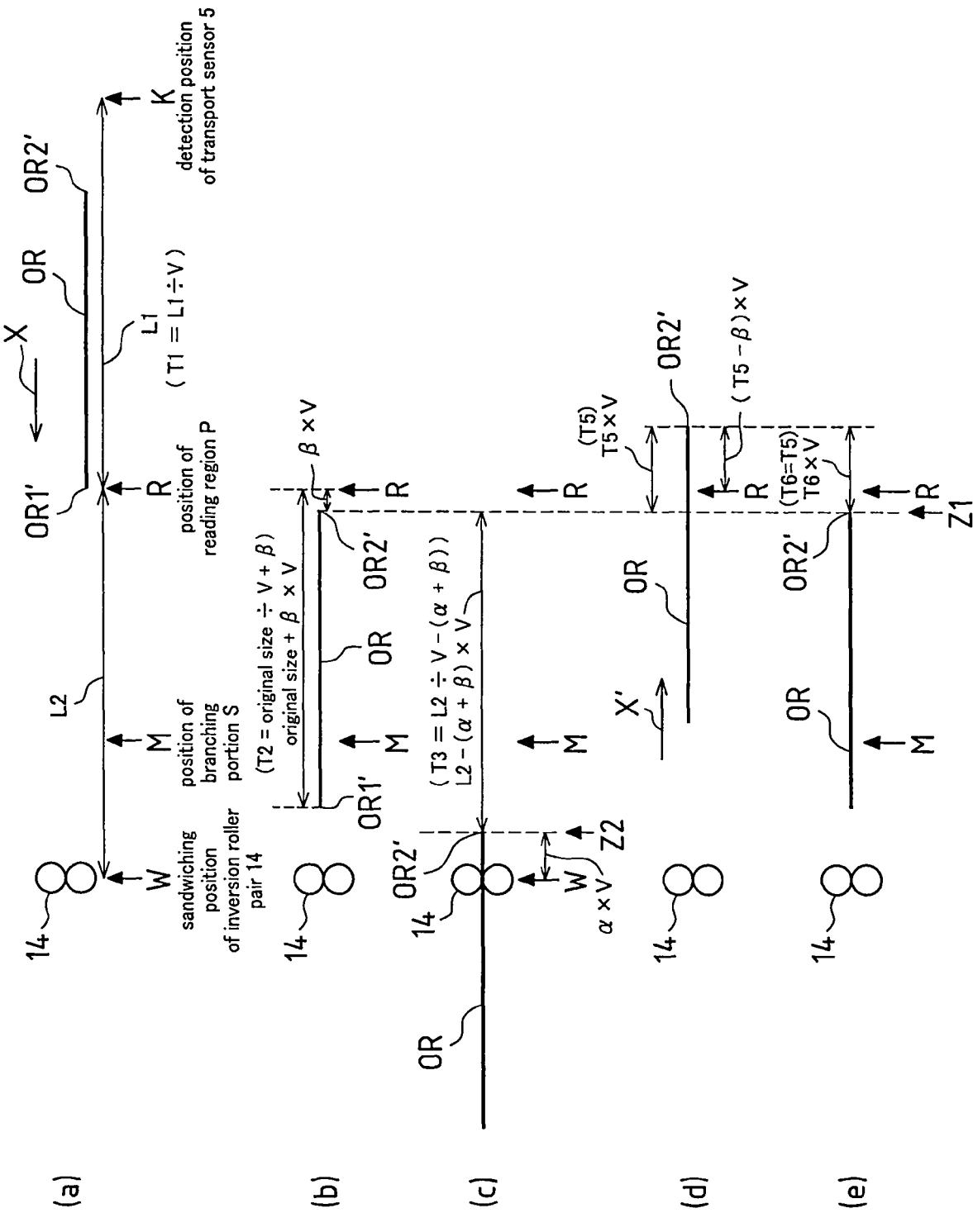
FIG. 7 is constituted by FIG. 7A, FIG. 7B, FIG. 7C, FIG. 7D, and FIG. 7E, and includes diagrams showing how the original is transported by the roller pairs.

Description of One Example of an Operation Flow for Foreign Matter Removal, Which is a Foreign Matter Removal Process Next, description is given regarding one example of an operation flow in which foreign matter removal is executed by the main control portion 410. FIG. 5 and FIG. 6 are flowcharts showing single examples of operation flows by the main control portion 410 of the original transport and reading apparatus 100 shown in FIG. 1. It should be noted that the examples shown in FIG. 5 and FIG. 6 show operation flows when reading both sides of the original OR. Furthermore, FIG. 7 is a diagram showing how the original OR is transported by each of the roller pairs. It should be noted that in FIG. 7, the upstream side and downstream side transport roller pairs 6 and 13 are omitted from the diagram.

Processing of Steps S100 to S200 of FIG. 5

In this operation flow, when an instruction for reading is given to the original reading portion 300 (Y at step S100), reading is carried out by the CCD 12 of the original reading portion 300 while there is no original OR on the reading glass 7, and the presence/absence of foreign matter T such as paper dust (hereinafter referred to as paper dust T) is detected (step S105). If paper dust T is detected (N at step S105), a warning display is carried out (step S107) to suggest removal of the paper dust T to the user, then the procedure transitions to step S100.

If paper dust T is not detected (Y at step S105), then the presence/absence of the original OR is detected by the original presence/absence detection sensor 16, and if an original OR is present (Y at step S110), the original size is detected by the original size detection sensor 20 (step S120). On the other hand, if there is no original OR (N at step S110), then an error display is performed (step S115) reporting that there is no original OR, and the procedure transitions to step S100 and returns to a standby state again.

After detection of the original size at step S120, the foreign matter detection counter C is initialized ("0" is assigned to the counter C) (step S125), then forward rotation of the pickup roller 15, the separator roller 2, the upstream side transport roller pair 6, and the downstream side transport roller pair 13 (transport of the original OR in the transport direction X) is commenced by the transport drive portion 402 such as the transport motor (step S130). Here onward the transport drive portion 402 continues rotation until there is an instruction of some kind. Then, instruction is given to the sub CPU 420 (step S140) so as to cause forward rotation of the inversion roller pair 14 (transport of the original OR in the transport direction X) by the inversion drive portion 403 such as the inversion roller drive motor. Here onward the inversion drive portion 403 continues rotation until there is an instruction of some kind.

Next, the pickup roller drive portion 401 such as a pickup roller solenoid or the like is driven to cause the pickup roller 15 to contact an upper area of the original OR loaded in the original tray 1 for a predetermined time period T0 (for example, one second), thereby drawing out the original OR (step S150). The time period T0 is a time required for transporting a leading edge OR1' of the original OR between the separator roller 2 and the separation pad 3. Next, the transport sensor 5 performs detection for the arrival of the leading edge OR1' of the original OR (a change from a no-original state to an original-present state), and if the leading edge OR1' of the original OR has reached a detection position K of the transport sensor 5 (Y at step S160), then a standby is performed for a predetermined first time period T1 (step S170). The first time period T1 is a time required from the original leading edge OR1' reaching the detection position K of the transport sensor 5 until reaching the position (original reading position) R on the reading region P of the reading glass 7, and is a value in which a distance L1 from the detection position K of the transport sensor 5 until the position R of the reading region P of the reading glass 7 is divided by a transport speed V. The position of original OR after the passing of the first time period T1 is shown in FIG. 7A.

Next, instruction is given to the original reading portion 300 (step S180) to commence reading of the surface of one side of the original OR (hereinafter referred to as front surface).

Based on the instruction to commence reading, the original reading portion 300 uses the CCD 12 to read the front surface of the original OR being transported at the transport speed V over the reading region P of the reading glass 7 in the time in which the original OR is transported by the transport length of the original size detected by the original size sensor 20, and the image data outputted from the CCD 12 is stored in the storage portion. In this manner, the front surface of the original OR is read and a standby is performed (step S300) for a predetermined second time period T2. At this time, the front and back of the original OR are turned over. The second time period T2 is (original size)÷(transport speed V)+β, and corresponds to a time until the original OR passes the reading glass 7 and is transported for a further time β. Here, the original size refers to a transport direction X length of the original OR. Furthermore, the time β signifies a time in which the original OR is transported at the transport speed V from the position (original reading position) R on the reading region P of the reading glass 7 until a predetermined position Z1 of the original trailing edge OR2' positioned between the position R and a position M of the branching portion S. The position of original OR after the passing of the second time period T2 is shown in FIG. 7B. It should be noted that approximately 5 mm can be given as an example of a distance (β×V) between the position Z1 of the original trailing edge OR2' and the original reading position R.

Then the CCD 12 of the original reading portion 300 performs detection for the presence/absence of paper dust T (step S310) and if no paper dust T is present (Y at step S310), the foreign matter detection counter C is cleared (step S185) and standby is performed for a predetermined third time period T3 (step S190). The third time period T3 is L2÷V−(α+β). It should be noted that a distance L2 signifies a distance from the position (original reading position) R of the reading region P until a sandwiching position W of the inversion roller pair 14, and a time α signifies a time in which the original OR is transported at the transport speed V from a predetermined position Z2 of the original trailing edge OR2' positioned between the position M of the branching portion S and the sandwiching position W of the inversion roller pair 14 until the sandwiching position W. That is, a distance (α×V) corresponds to a distance from the sandwiching position W of the inversion roller pair 14 until the original trailing edge OR2' when the original OR that is sandwiched by the inversion roller pair 14 is inverted. The position of the original OR after the passing of the third time period T3 is shown in FIG. 7C.

Next, the inversion drive portion 403 such as the inversion motor performs reverse rotation for a predetermined fourth time period T4, which is required for the original OR to reach at least the downstream side transport roller pair 13 and for the sandwiching state of the original OR by the inversion roller pair 14 to be released, after which instruction is given to the sub CPU 420 so as to return to forward rotation (step S200). For example, the fourth time period T4 can be calculated using (original size)÷(transport speed V). It should be noted that this example was described using a case of double-side reading of the original OR, but in the case where only the front surface is to be read, here the processing from step S260 onward in FIG. 6 is executed without the inversion roller pair 14 performing reverse rotation.

On the other hand, in case where paper dust T has been detected at step S310 (N at step S310) while the original OR is in the position of FIG. 7B, the foreign matter detection counter C is increased by 1 (step S313), and if the foreign matter detection counter C is less than a predetermined number of times (five times in this example) (Y at step S317), then the transport drive portion 402 and the inversion drive portion 403 are caused to perform reverse rotation for a predetermined fifth time period T5 to cause the original OR shown in FIG. 7B to go backward, thereby causing the trailing edge portion OR2 of the original OR to contact at least reading region P of the reading glass 7 and remove the paper dust T (step S320). Here the fifth time period T5 is a value greater than the value of the time β and is a time period in which the original trailing edge OR2' rubs against the reading glass 7 by a length in which transport is performed for a predetermined (T5−β) time, thereby removing the paper dust T to the upstream side from the reading region P in the transport direction X. FIG. 7D shows the state when the original OR is caused to go backward from the position in FIG. 7B for the fifth time period T5. It should be noted that approximately 10 mm can be given as an example of the distance ((T5−β)×V) at this time between the original trailing edge OR2' and the position (original reading position) R of the reading region P. After this, the transport drive portion 402 and the inversion drive portion 403 return to forward rotation (step S330) and standby for a predetermined sixth time period T6 (step S340), then the procedure transitions to step S310. In the sixth time period T6, which corresponds to the fifth time period T5, the original OR is transported until the position shown in FIG. 7E so that the trailing edge OR2' is positioned between the position M of the branching portion S and the position (original reading position) R of the reading region P of the reading glass 7. On the other hand, if the foreign matter detection counter C reaches the predetermined number of times (five times in this example) at step S317 (N at step S317), then the procedure transitions to "warning processing" from step S400 onward in FIG. 6B.

Warning Processing in FIG. 6B

If the foreign matter detection counter C reaches the predetermined number of times (five times in this example) at step S317, then a display is performed prompting the user to carry out a foreign matter removal task since automatic foreign matter removal is difficult (S400), and processing is finished by discharging the original OR inside the original transport portion 200 from the original transport portion 200 to the discharge tray 17 (step S410).

Processing from Step S210 Onward in FIG. 6A

After the processing of step S200 in FIG. 5, when the leading edge OR1' of the original OR is detected again by the transport sensor 5 (Y at step S210), a standby is performed for the first time period T1 (step S220) and instruction is given to the original reading portion 300 to commence reading of the other side surface (back surface) of the original OR (step S230).

Based on the instruction to commence reading, the original reading portion 300 executes reading of data for the original size in the same manner as reading for the front surface and performs a standby for the second time period T2 (step S300), and at this time the front and back of the original OR are again turned over. Then detection is performed for paper dust T (step S310) and if there is no paper dust T (Y at step S310), then the foreign matter detection counter C is reset (step S235) and a standby is performed for the third time period T3 (step S240), and the inversion roller pair 14 is reverse rotated for the fourth time period T4, after which instruction is given to the sub CPU 420 to return to forward rotation (step S250). At this time, the original OR is again turned over without being read.

When the trailing edge OR2' of the original OR is detected by the discharge sensor 19 (detection of a change from the original-present state to the no-original state) (Y at step S260), it is judged that the original OR has been discharged to the discharge tray 17 and the procedure transitions to controlling the transport of the next original OR. When it is detected by the original presence/absence detection sensor 16 that an original is present (Y at step S270), the procedure returns to step S150 of FIG. 5 again and waits until leading edge detection of step S160. If there is no original OR (N at step S270), then processing finishes.

On the other hand, the processing of step S313 to step S340 after the paper dust T has been detected at step S310 (N at step S310) in FIG. 6A is equivalent to the processing shown in step S313 to step S340 of FIG. 5, and therefore description thereof is omitted here.

Modified Example 1

Instead of the detection of the foreign matter detection portion or together with the detection of the foreign matter detection portion, the original transport and reading apparatus 100 according to the present embodiment may be configured as follows. Namely, the control portion 400 (main control portion 410) may be provided with an original transport counter D that counts the transport sheet number of the originals OR, and the foreign matter removal may be executed if the transport sheet number of the originals OR by the original transport counter D reaches an integral multiple of a predetermined number of sheets.

Figure 8:
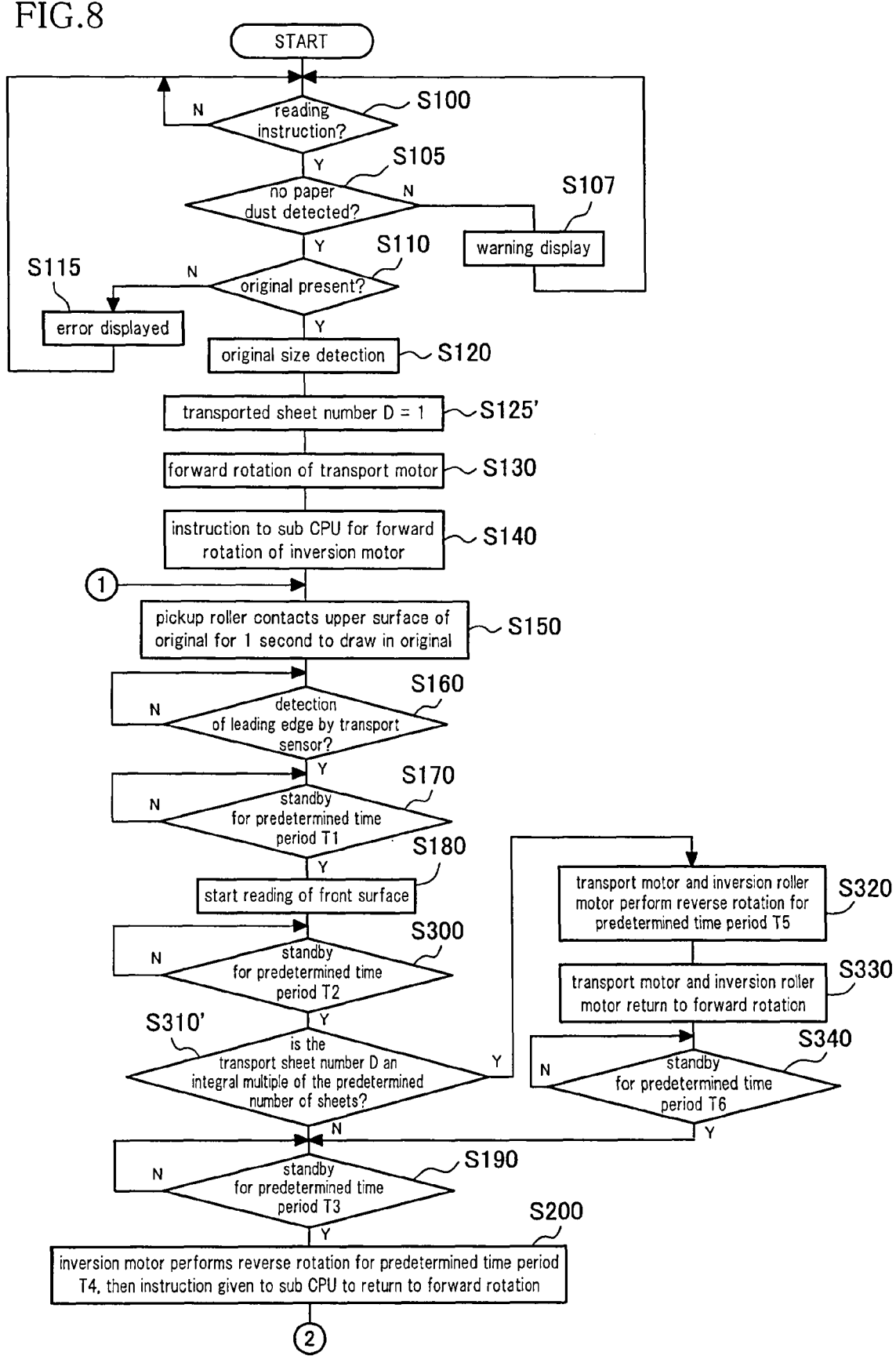
FIG. 8 is a diagram showing a first half portion of a flowchart showing a modified example of an operation flow by the main control portion of the original transport and reading apparatus shown in FIG. 1.
Figure 9:
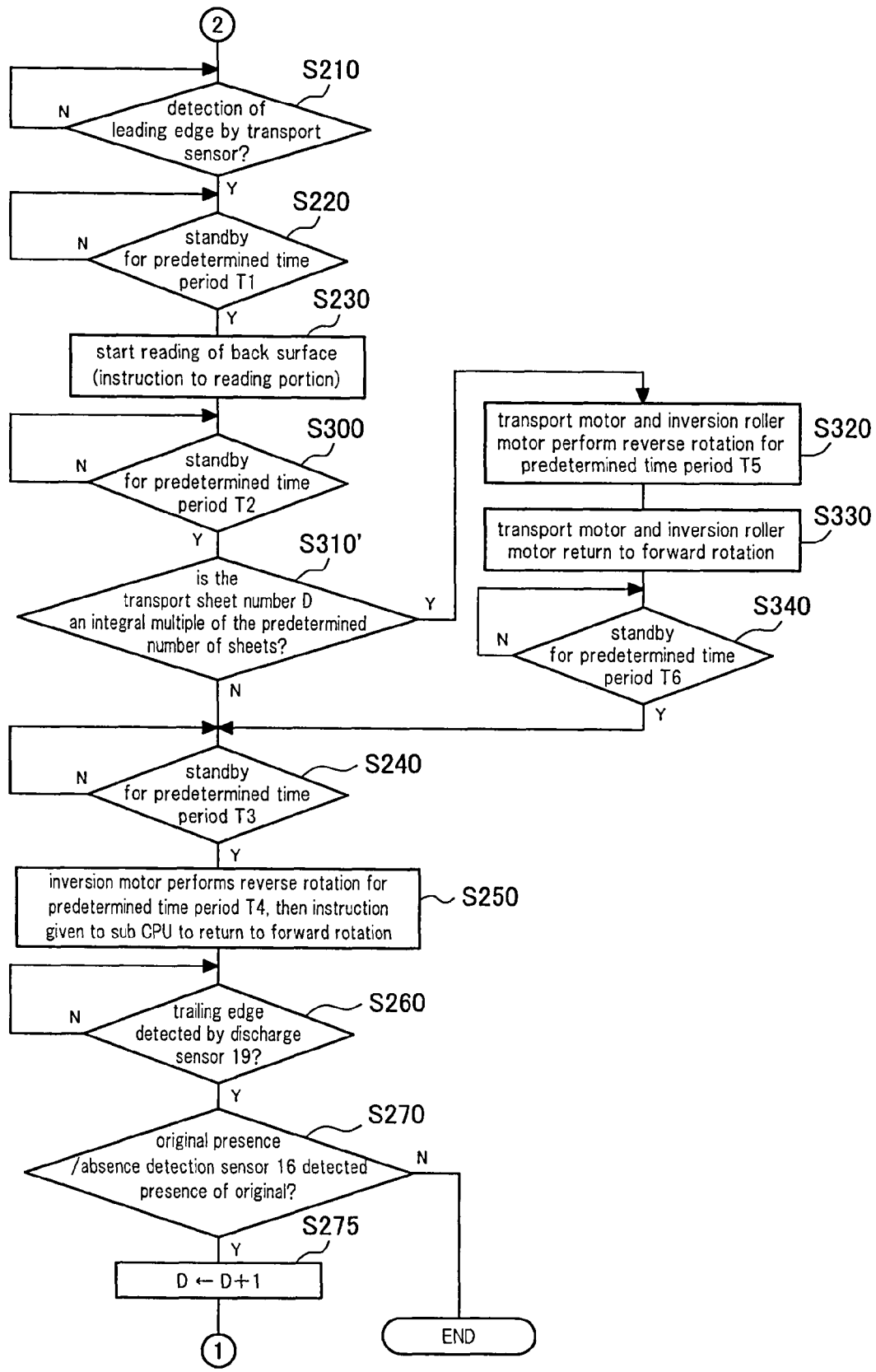
FIG. 9 is a diagram showing a latter half portion of the flowchart showing a modified example of an operation flow by the main control portion of the original transport and reading apparatus shown in FIG. 1.

FIG. 8 and FIG. 9 are flowcharts showing modified examples of operation flows by the main control portion 410 of the original transport and reading apparatus 100 shown in FIG. 1. It should be noted that for processing in FIG. 8 and FIG. 9 that is the same processing as the processing in FIG. 5 and FIG. 6, same numerical symbols are assigned and description thereof is omitted.

In the flowchart shown in FIG. 8, steps S125' and S310' replace steps S125 and S310 respectively in the flowchart shown in FIG. 5, steps S185, S313, and S317 are deleted, and a determination of "Yes" at step S340 is set so as to transition to step S190. Furthermore, in the flowchart shown in FIG. 9, step S310' replaces step S310 in the flowchart shown in FIG. 6, steps S235, S313, S317, S400, and S410 are deleted, and a determination of "Yes" at step S340 is set so as to transition to step S240, and further still step S275 is added after step S270.

In the operation flow shown in FIG. 8, the original transport counter D is reset ("1" is assigned to the counter D) when transport of the original OR commences after detection of the original size at step S120 (step S125').

Furthermore, at step S310', detection is performed as to whether or not the original transport counter D has reached an integral multiple of the predetermined number of sheets, and if it has not reached this (N at step S310'), then the procedure transitions to step S190. On the hand, in the case where the original transport counter D has reached an integral multiple of the predetermined number of sheets (Y at step S310'), then steps S320 and S330 are processed. Then, after a standby of the sixth time period T6 at step S340, the procedure transitions to step S190.

At step S310' of the operation flow shown in FIG. 9, detection is performed as to whether or not the original transport counter D has reached an integral multiple of the predetermined number of sheets, and if it has not reached this (N at step S310'), then the procedure transitions to step S240. On the hand, in the case where the original transport counter D has reached an integral multiple of the predetermined number of sheets (Y at step S310'), then steps S320 and S330 are processed. Then, after a standby of the sixth time period T6 at step S340, the procedure transitions to step S240. Furthermore, at step S275, one is added to the original transport counter D for each original OR that is discharged, then the procedure transitions to step S150.

In this manner, the original transport and reading apparatus 100 that executes the operation flows shown in FIG. 8 and FIG. 9 can execute the above-described foreign matter removal when the transport sheet number of the originals OR has reached an integral multiple of the predetermined number of sheets.

Modified Example 2

The original transport and reading apparatus 100 according to the present embodiment may be configured to enable operation of selectively inputting a thin paper original mode and a thick paper original mode for example, and when the control portion 400 (main control portion 410) is configured to make the advancement speed of when causing the original OR to advance in the reverse transport direction X' lower than the transport speed V during original reading for executing the above-described foreign matter removal in the case where the thin paper original mode has been selected and the original thickness is assumed to be a predetermined first thickness or less, the following control and operation are possible.

Namely, in the case where the thin paper original mode is selected for example before reading the original OR, rotation control can be performed at step S320 of the operation flow such that the rotation speed of the transport drive portion 402 and the inversion drive portion 403 during reverse rotation is slower than a reference rotation speed V during original reading.

Modified Example 3

The original transport and reading apparatus 100 according to the present embodiment may be configured to enable operation of selectively inputting a thin paper original mode and a thick paper original mode for example, and when the control portion 400 (main control portion 410) is configured to make the advancement speed of when causing the original OR to advance in the reverse transport direction X' higher than the transport speed V during original reading for executing the above-described foreign matter removal in the case where the thick paper original mode has been selected and the original thickness is assumes to exceed a predetermined second thickness, the following control and operation are possible.

Namely, in the case where the thick paper original mode is selected for example before reading the original OR, rotation control can be performed at step S320 of the operation flow such that the rotation speed of the transport drive portion 402 and the inversion drive portion 403 during reverse rotation is faster than the reference rotation speed V during original reading.

Modified Example 4

In the original transport and reading apparatus 100 according to the present embodiment, when the control portion 400 (main control portion 410) is configured such that, during a one-time execution of the foreign matter removal, the original OR is caused to move multiple times backward and forward so that the trailing edge OR2' passes over at least the reading region P while the trailing edge portion OR2 is in contact with the reading glass 7, the following operation flow is possible.

Namely, it is possible at step S320 of the aforementioned operation flow to repeat multiple times a first operation, in which the transport drive portion 402 and the inversion drive portion 403 are caused to rotate in reverse for a fifth time period T5 to cause the original OR to go backward, and a second operation, in which the transport drive portion 402 and the inversion drive portion 403 are caused to rotate forward for the fifth time period T5 to cause the original OR to go forward, after which the first operation is executed and the procedure transitions to step S330.

Modified Example 5

In the original transport and reading apparatus 100 according to the present embodiment, in executing the above-described foreign matter removal, when the control portion 400 (main control portion 410) uses the CCD 12 of the original reading portion 300 to read the trailing edge OR2' of the original OR that is advancing in the reverse transport direction X', and causes the original OR to move using the time of reading of the trailing edge OR2' by the CCD 12 (position R of the original reading region P) as a reference, the following control and operation are possible.

Figure 10:
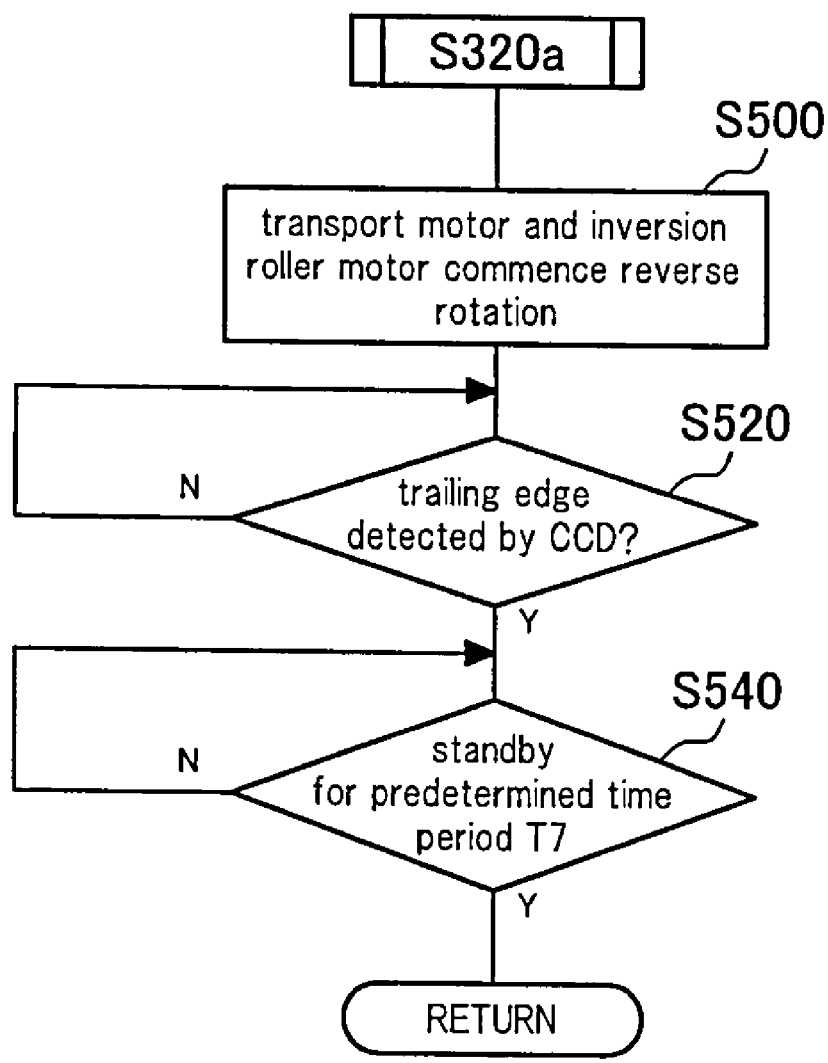
FIG. 10 is a diagram showing one example of a processing routine in which the trailing edge of the original is read by the original reading portion and the time of reading of the trailing edge is used as a reference in controlling a movement distance of the original.

Namely, instead of step S320 in the aforementioned operation flow, an operation flow shown in FIG. 10 (processing routine of step S320a) can be executed. In the operation flow shown in FIG. 10, once the original OR has been caused to go backward (step S500) and after the trailing edge OR2' of the original OR has been detected by the CCD 12 (step S520), a standby is performed for a predetermined seventh time period T7 (step S540) and the procedure returns to step S330 of the aforementioned operation flow. The seventh time period T7 is a time required for the original OR to be transported in the reverse direction X' from the reading position R by a predetermined distance (for example, approximately 1 mm to 10 mm) and is a time that corresponds to $(T5-\beta)$ in FIG. 7.

The present invention can be embodied and practiced in other different forms without departing from the spirit, purport or essential characteristics thereof. Therefore, the above-described embodiments are to be considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An original transport and reading apparatus, comprising:
an original transport portion that transports an original, an original reading portion that reads the original transported by the original transport portion through a reading region of an optically transmissive member, and a control portion that controls the original transport portion,
wherein the control portion executes foreign matter removal at the reading region of the optically transmissive member by controlling the original transport portion so as to cause the original to advance, without turning over the original, in a reverse direction to a transport direction of when the original is being read and causes the original to contact at least the reading region of the optically transmissive member.

2. The original transport and reading apparatus according to claim 1, comprising:
a foreign matter detection portion that detects the presence/absence of foreign matter at the reading region of the optically transmissive member,
wherein the control portion determines the presence/absence of foreign matter based on an output from the foreign matter detection portion after reading of the original and executes the foreign matter removal when foreign matter is judged to be present.

3. The original transport and reading apparatus according to claim 2,
wherein the original transport portion is provided with a reading guide that is arranged so as to face the reading region of the optically transmissive member with the original to be transported in between, a portion of the reading guide, the portion facing at least the reading region, is a black color or a dark color, and the foreign matter detection portion detects the presence of foreign matter based on an output from the original reading portion when there is no original.

4. The original transport and reading apparatus according to claim 2,
wherein the control portion determines the presence/absence of foreign matter based on an output from the foreign matter detection portion after execution of the foreign matter removal and executes the foreign matter removal again when foreign matter is judged to be present.

5. The original transport and reading apparatus according to claim 4,
wherein in the case where the foreign matter removal is to be executed again, the control portion counts a number of times the presence of foreign matter has been detected continuously by the foreign matter detection portion, and when the presence of foreign matter has been detected continuously for a predetermined multiple number of times by the foreign matter detection portion after execution of the foreign matter removal, a warning is issued and operation of the apparatus is paused.

6. The original transport and reading apparatus according to claim 4,
wherein in the case where the foreign matter removal is to be executed again, the control portion counts a number of times the presence of foreign matter has been detected continuously by the foreign matter detection portion, and when the presence of foreign matter has been detected continuously for a predetermined multiple number of times by the foreign matter detection portion after execution of the foreign matter removal, operation of the apparatus is paused after discharge of the original from an apparatus main unit.

7. The original transport and reading apparatus according to claim 1,
wherein the control portion counts a transport sheet number of the originals and executes the foreign matter removal for each predetermined number of sheets.

8. The original transport and reading apparatus according to claim 1,
wherein the original transport portion is provided with an original transport path that guides the original immediately after the original that is transported passes the optically transmissive member, and the original transport path is arranged inclined at a predetermined inclination angle with respect to the optically transmissive member.

9. The original transport and reading apparatus according to claim 1,
wherein in executing the foreign matter removal, in the case where an original thickness is a predetermined thickness or less, the control portion sets the advancement speed of when causing the original to advance in a reverse direction to the transport direction lower than a transport speed during original reading.

10. The original transport and reading apparatus according to claim 1,
wherein in executing the foreign matter removal, in the case where an original thickness exceeds a predetermined thickness, the control portion sets the advancement speed of when causing the original to advance in a reverse direction to the transport direction higher than a transport speed during original reading.

11. The original transport and reading apparatus according to claim 1,
wherein in executing the foreign matter removal, the control portion causes the original to move multiple times backward and forward so that an upstream side edge of the original in the transport direction passes over at least the reading region while the original is in contact with the optically transmissive member.

12. The original transport and reading apparatus according to claim 1,
wherein in executing the foreign matter removal, the control portion uses the original reading portion to read an upstream side edge of the original in the transport direction and controls the movement distance of the original using the time of reading of the upstream side edge by the original reading portion as a reference.

* * * * *